May 27, 1947. G. H. PRIDE 2,421,128
MEANS FOR HANDLING LOADS IN VEHICLES
Filed July 29, 1944 4 Sheets-Sheet 1

INVENTOR
GEORGE H. PRIDE
ATTORNEYS

May 27, 1947.　　　　G. H. PRIDE　　　　2,421,128
MEANS FOR HANDLING LOADS IN VEHICLES
Filed July 29, 1944　　　4 Sheets-Sheet 3

INVENTOR
GEORGE H. PRIDE
BY
Fraser, Myers + Manley
ATTORNEYS

Patented May 27, 1947

2,421,128

UNITED STATES PATENT OFFICE 2,421,128

MEANS FOR HANDLING LOADS IN VEHICLES

George H. Pride, New York, N. Y.

Application July 29, 1944, Serial No. 547,216

4 Claims. (Cl. 214—65)

This invention relates to improvements in means for handling loads in vehicles and pertains more particularly to coacting means for separately shifting plural load units of material from the floor of a vehicle onto a supporting surface at the exterior of the vehicle, or vice versa.

The present invention is also useful in unloading and loading a vehicle, wherein plural load units may be shifted mechanically from within the vehicle onto a tailboard thereof and then raised or lowered to a suitable discharge supporting surface or platform or may be shifted mechanically from the tailboard into the vehicle. The term "vehicle" is used herein and in the accompanying claims to include a truck, trailer, car, or other shipping receptacle or container which may be adapted to receive material to be transported from one point to another.

An important object is the provision of a pallet or removable floor plate of a vehicle upon which a unit of material may be disposed and which is adapted to cooperate with other elements of the mechanism to be withdrawn from beneath a unit of material during an unloading operation to deposit said unit upon skids or the like without breaking up the unit.

Another important object is the provision of plural pallets or removable floor plates of a vehicle upon each of which a unit of material may be assembled upon skids or the like, each pallet of floor plate being adapted to cooperate with other elements of the mechanism to shift itself, with its load unit, from the skids, onto the floor supporting portion of the vehicle.

Another object is the provision of means for mechanically loading plural load units of material separately into a vehicle without breaking up the units and also for mechanically unloading such units from a vehicle without breaking them up.

Another object of the present invention is the provision of a vehicle loading and unloading mechanism capable of handling large loads or units of material with much less manual operation or control than heretofore.

Another object of the invention is the provision of mechanical means for separately shifting units of material from a tailboard of a vehicle into the said vehicle or for separately shifting the units out of the vehicle onto its tailboard, the tailboard being capable of being raised or lowered to aid in accomplishing this object.

These and other objects and advantages are derived from the present invention, of which, for the purpose of illustration; one embodiment is illustrated in the accompanying drawings of which—

*An exemplary vehicle in which the invention may be employed*

Figure 1:
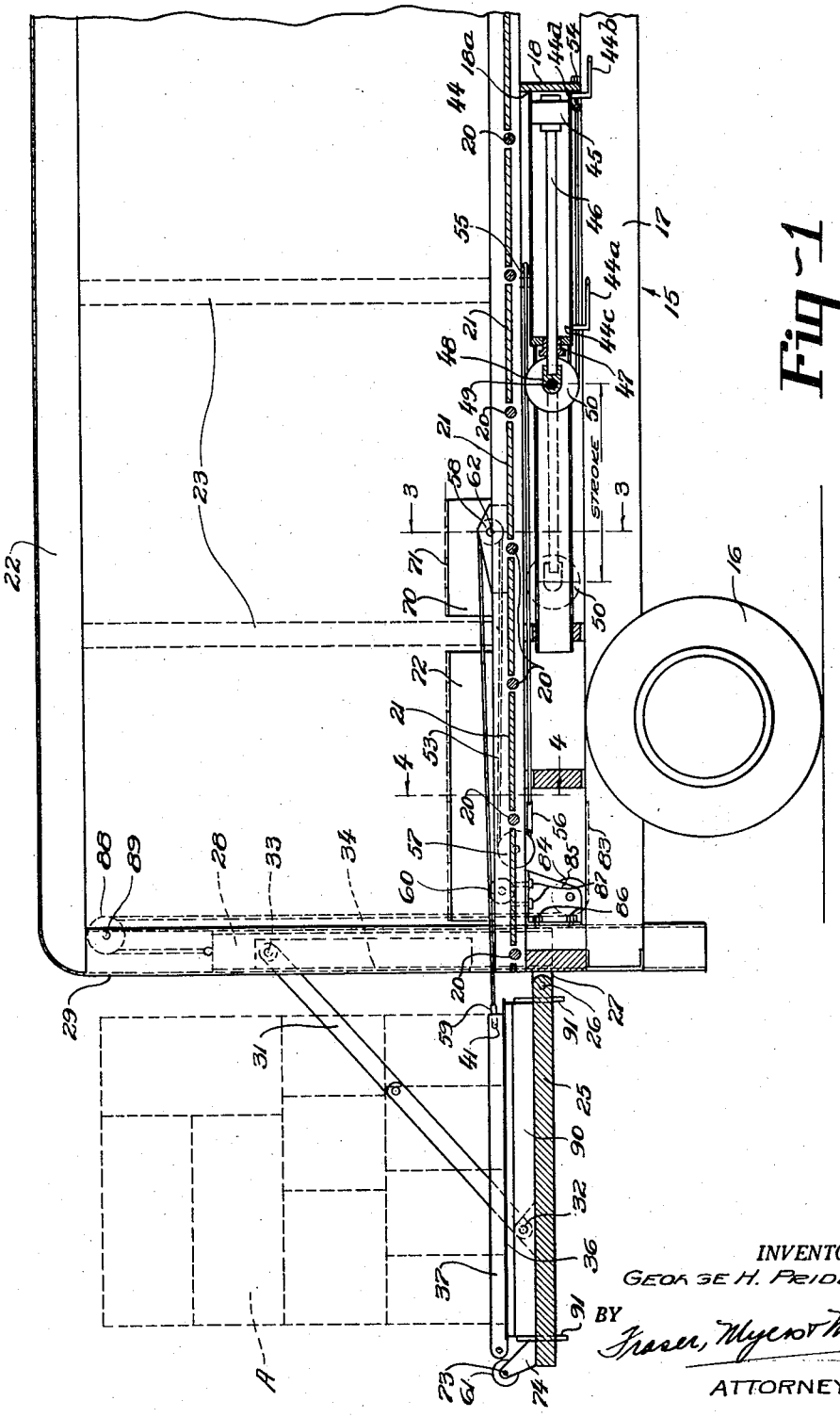
Figure 1 is a vertical longitudinal sectional view of the rear end of a truck trailer embodying the present invention, showing the load unit shifting mechanism prepared for pulling a unit of material into the trailer, this view being substantially on the line 1—1 of Fig. 2.
Figure 3:
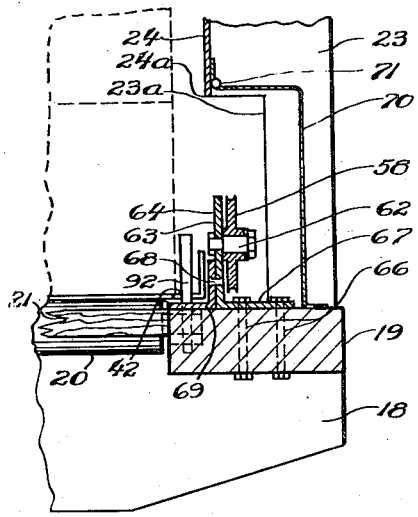
Fig. 3 is a fragmentary cross-sectional view substantially on the line 3—3 of Fig. 1.
Figure 4:
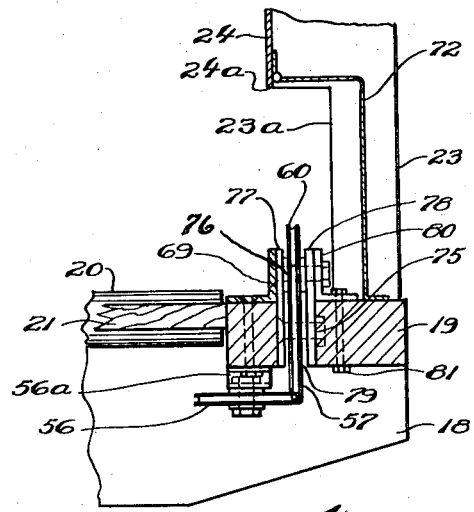
Fig. 4 is a fragmentary cross-sectional view substantially on the line 4—4 of Fig. 1.

Referring to Figs. 1, 3 and 4, a trailer with which the present invention is illustrated may comprise a chassis 15 suitably mounted on wheels 16, of which only one rear wheel is shown. The chassis may comprise longitudinal stringers 17 toward each side of the trailer, only one such stringer being shown, a plurality of transverse bolsters 18 suitably supported upon said stringers, a longitudinal plate 19 extending from the front to the rear of the trailer along each side thereof and supported upon said bolsters, (see Figs. 3 and 4), a plurality of transverse rollers 20 suitably journaled at opposite ends in the plates 19 and fill-in flooring or sub-flooring 21 supported by the plates 19 and so arranged between said rollers that the upper surfaces of the sub-flooring are in a substantially horizontal plane slightly below the top surfaces of said rollers.

Although an open vehicle may employ the invention, nevertheless, as illustrated, a suitable body may be mounted on the chassis 15 and may comprise a top 22 supported by a plurality of side uprights 23 which are suitably fixed at their lower end upon or into the plates 19 in such fashion as to afford sufficient rigidity to the body of the trailer. To present a smooth inside wall surface, a lining 24 of sheet metal, plywood, or other suitable material, may be fixed to the inner sides of the uprights 23.

Figure 2:
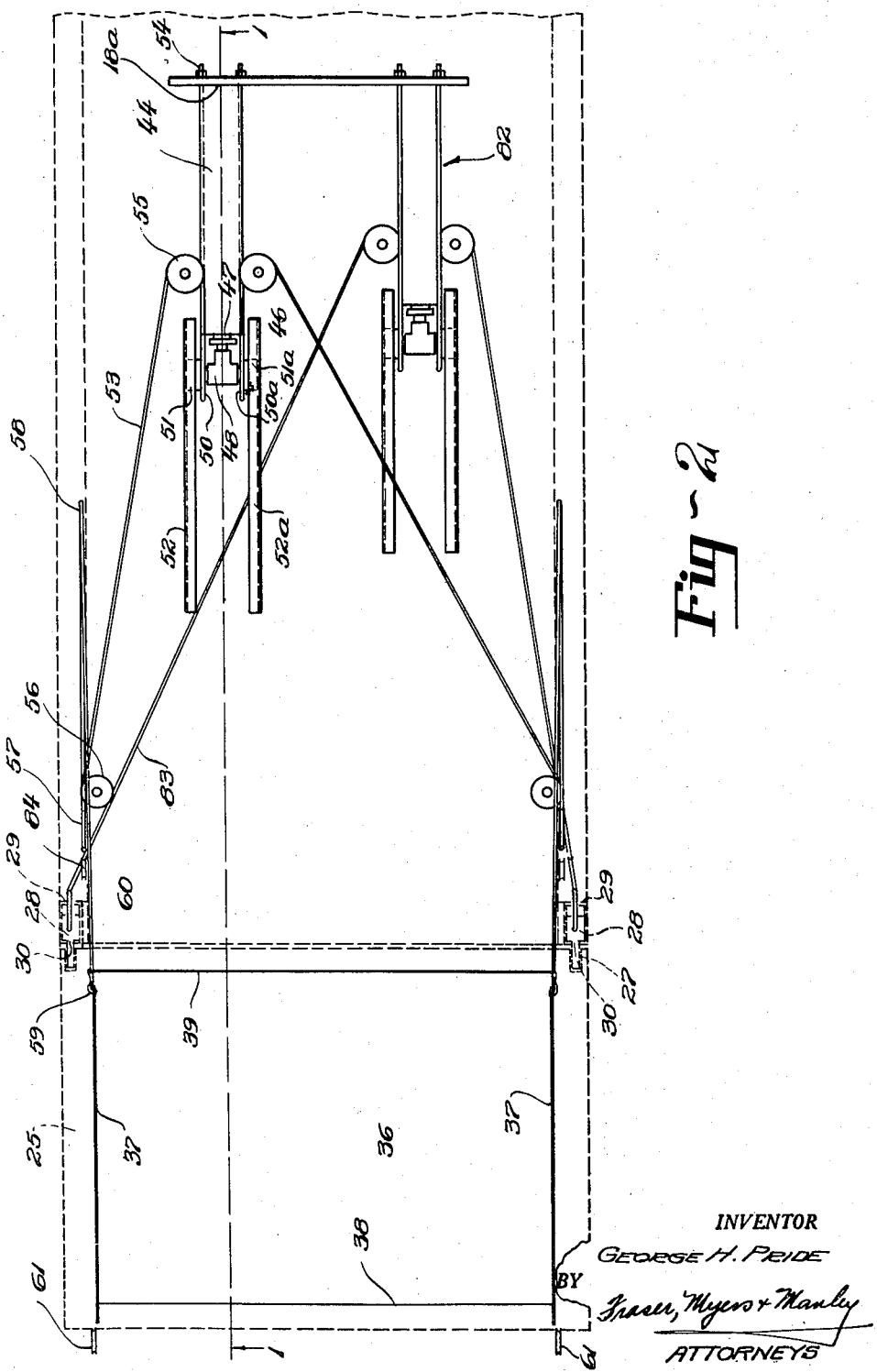
Fig. 2 is a top plan view of the loading and tailboard elevating mechanism, the actual trailer structure for the most part being omitted for clearness, although some portions of the trailer are indicated in broken lines in order to properly indicate the location of the various operating parts of said mechanism.

A tailboard 25 is preferably pivoted at its forward end, as at 26, to lugs 27 which are integral with or suitably fixed to the lower ends of upright sliding columns 28, which, as best seen in Fig. 2, slide vertically within complementally hollowed rear stanchions 29 at opposite sides of the trailer body at the rear end thereof. The stanchions are provided with vertical slots 30 through which the lugs 27 extend and in which the latter slide as the tailboard is raised or lowered as hereinafter explained.

Toggle tailboard supports 31 may be pivoted to the tailboard 25 at opposite sides thereof as at 32 and may extend through the slots 30 to pivotal connections with the columns 28 as at 33. Vertical recesses 34 in the said columns, extending downwardly from the connections 33, are adapted to receive the folded tailboard supports 31 which break downwardly when the tailboard is pivoted to a vertical or closed position.

*The load unit shifting mechanism*

Figure 5:
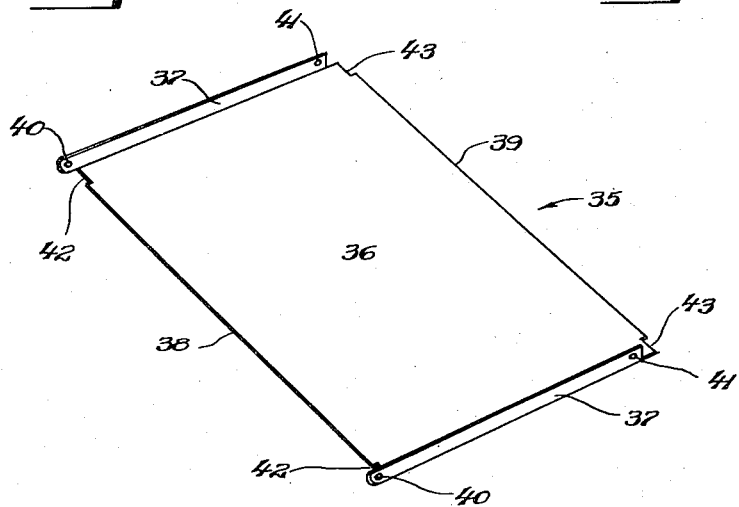
Fig. 5 is a perspective view of one of plural removable floor plates of the trailer, sometimes referred to herein as a "pallet."

The load unit shifting mechanism, generally speaking, comprises substantially similar pallets 35 (Fig. 5) each of which is adapted to support a load unit A, comprising material suitably stacked upon the pallet, and suitably actuated cables, working over a system of sheaves, for individually moving each pallet, and a load unit thereon, substantially horizontally into or out of the vehicle.

Each of the pallets 35 preferably comprises a body portion 36 of sheet metal or other material suitable for the purposes hereinafter described. Opposite side edges preferably are reinforced by upstanding flanges 37 extending somewhat beyond the rear edge 38 of the pallet and somewhat short of the forward edge 39 of the pallet. Each pallet preferably may be provided with holes 40 at the rear ends of the flanges 37, holes 41 at the forward ends of said flanges, recesses 42 at each rear corner of the body portion 36, and recesses 43 at each forward corner of said body portion, all for purposes hereinafter explained. The several pallets are of a width only slightly less than the interior width of the vehicle body and substantially of a length of which the interior length of the vehicle body is a multiple. When the vehicle is loaded, the several pallets, each supporting a load unit, are substantially in the endwise relationship indicated in Fig. 8. Thus it will be seen that the several pallets 35 constitute the floor of the vehicle; and the said pallets are referred to hereinafter in the claims as floor plates.

The cable and sheave system of the load unit shifting mechanism, as best understood from Figs. 1 and 2, comprises substantially identical cables and sheaves at opposite sides of the vehicle; therefore the said cable and sheave system is described chiefly with respect to only one side of the vehicle. The reference characters in the various cable and sheave systems disclosed in the drawings may be considered as applicable to similar parts at opposite sides of the vehicle, except as otherwise indicated.

A double-acting hydraulic cylinder 44 is preferably fixed in a horizontal position in the chassis in any suitable manner as, for example, by being fixed at its forward end to one of the transverse bolsters 18 as at 18a. The cylinder 44 may have a piston 45 fixed to the inner end of a piston rod 46 which extends through a suitable packing 47 and has a crosshead 48 fixed upon its outer end. Upon opposite ends of a shaft 49 extending through said crosshead are mounted free-running sheaves 50, 50a, and guide rollers 51, 51a, which may work within suitable horizontal guideways 52, 52a, to restrain the crosshead 48 against any material turning or cocking. The sheave 50a, is a part of the sheave system on the side of the vehicle which is not herein specifically described and functions similarly to sheave 50.

A cable 53 may be suitably anchored at one end as at 54, to a bolster 18 disposed forwardly of the cylinder 44. Tracing the course of the cable 53 from said anchorage, it extends rearwardly to and around sheave 50, then forwardly to and around sheave 55, then rearwardly into guiding engagement with sheave 56, then to the lower side of sheave 57 and upwardly around or partially around the latter to a point above the level of the sub-flooring 21. From this point the cable 53 may, as desired by the operator for various purposes, be extended in either of several ways as indicated in Figs. 6–10. Thus, as in Figs. 6 and 7, it may be extended forwardly from sheave 57 to and around sheave 58, thence rearwardly to its free end upon which may be secured a suitable hook 59 for purposes hereinafter explained.

Figure 8:
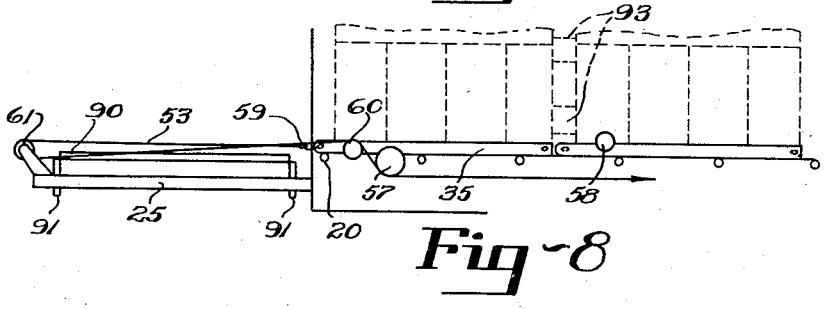
Fig. 8 is a diagram somewhat similar to Fig. 6 but showing the shifting mechanism prepared for pulling a unit of material from within the trailer or from a position thereon.
Figure 9:
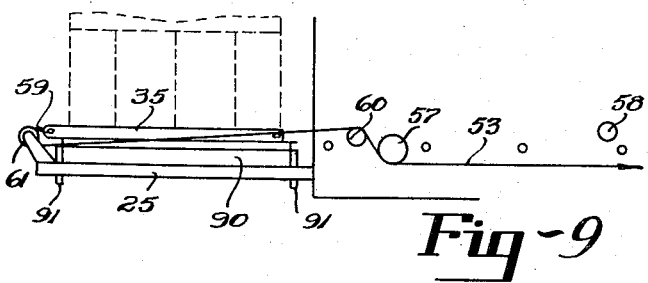
Fig. 9 is a diagram somewhat similar to Fig. 8 but showing the relation of the parts of the mechanism after the unit has been pulled from within or on the trailer onto the tailboard thereof.
Figure 10:
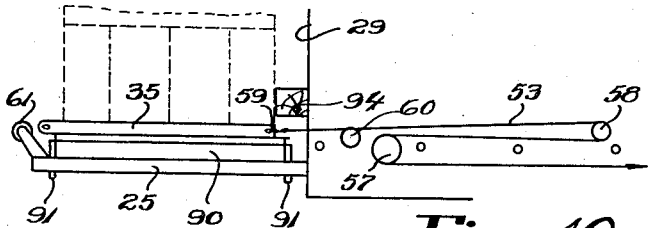
Fig. 10 is a diagram of the load unit shifting mechanism somewhat similar to Fig. 6, the parts of the mechanism, however, being shown prepared for pulling a pallet from a unit of material without, however, disturbing the other parts of said unit.

In an alternative cable arrangement, as in Figs. 8 and 9, the cable 53 may pass from the sheave 57 to and over a sheave 60, then rearwardly to and around a sheave 61 at the rear end of the tailboard 25, thence to the hook 59 on its free end. The arrangement of cable 53 upon its sheaves, in Fig. 10, is similar to that of Fig. 6, although for a different purpose, as will be explained.

The several sheaves in the shifting mechanism are preferably disposed substantially as shown in the drawings and suitable sheave mountings, of course, are provided. Sheaves 55 and 56 preferably turn upon vertical shafts which may be carried rigidly in suitable brackets secured to a fixed part of the chassis 15. Such a bracket 56a, carrying the sheave 56, is shown in Fig. 4. The sheaves 57, 58, 60, 61, preferably turn upon horizontal transversely extending shafts carried rigidly in suitable brackets secured to the chassis 15 or (as with sheave 61) to the tailboard 25.

It should be observed that, to facilitate changing of the cable 53 as between the several mentioned alternative dispositions thereof upon its related sheaves, the sheaves 58 and 61, preferably, are mounted upon stub shafts which are supported only at one side of the sheave so that the cable may be readily placed upon or removed from the said sheaves without involving threading of the cable around the sheaves. Thus, referring to Fig. 3 the sheave 58 turns upon a stub shaft 62 which may be fixed, at its inner end, into the upright flange 63 of an angle bracket 64. The latter may be securely fastened down by bolts 66 extending through the horizontal flange 67 of the bracket 64 and the longitudinal plate 19. To afford additional rigidity to the bracket 64, the flange 63 may be riveted, as at 68, to a metal angle stringer 69 which preferably extends longitudinally along the bottom of the interior of the side wall of the vehicle and serves as a guideway for the pallets 36. The stringer 69 may be suitably secured to the uprights 23 and may be additionally secured to the longitudinal plate 19 in any suitable manner.

From Fig. 3 it may be understood that the cable 53 may be placed upon or removed from the sheave 58 by the operator from the exterior of the vehicle. The body lining 24 at and rearwardly of the sheave 58 extends downwardly only to a point above the top of the said sheave as at 24a, and the uprights 23, rearwardly of said sheave, are cut out at the inner sides of their lower ends, as at 23a, sufficiently to provide clear working space for the cable 53 and for the changing of the latter as between its mentioned alternative dispositions. An inverted L shaped cover or door 70, may be hinged as at 71 to the body lining 24 to cover the said sheave and cable. This cover, of course may easily be swung outwardly and upwardly to afford access to the sheave and cable. A somewhat similar, although longer door or cover 72 may be provided rearwardly of the cover 70 for covering sheaves 57 and 60 and the cable 53 while nevertheless affording access thereto. Similar doors or covers may be provided, of course, at the opposite side of the vehicle.

The mounting of the sheave 61 may be generally similar to the mounting of sheave 58 in that the stub-shaft 73 of the sheave 61 is supported only at one side of the latter in a bracket 74 which may be suitably fixed upon the rear of the tailboard 25 in the general position indicated in Figs. 1 and 2. Thus the cable 53 may easily be placed upon and removed from the said sheave.

The sheaves 57 and 60 may turn upon shafts 75 and 76 respectively, as shown in Fig. 4, supported at their opposite ends in plates 77 and 78 which may extend through a slot 79 in the longitudinal plate 19 and be riveted or otherwise secured to the stringer 69 and to an angle bracket 80, the latter being suitably mounted upon the plate 19 as by bolts 81, of which one is shown in Fig. 4.

The particular means for supplying pressure fluid to the cylinder 44 are not shown in detail as various means may be employed for that purpose. It should suffice to observe that pipes 44a, 44b, connected to ports 44c, 44d, at opposite ends of said cylinder (Fig. 1), may be connected, in a well understood manner, to a reversible fluid pump or to a reversible valve in a suitable hydraulic system, the control means of said pump or valve being disposed in a suitable location convenient for operation by the operator of the vehicle.

The tailboard elevating mechanism

The tailboard elevating mechanism, as may be understood from Fig. 2 may employ a hydraulic cylinder and guided crosshead assembly, generally identified as 82, which is substantially similar to the hydraulic arrangement hereinbefore described with respect to the load unit shifting mechanism. As with the said shifting mechanism, substantially identical sheave and cable assemblies are provided at each side of the vehicle, for raising and lowering the tailboard 25, and, therefore, the sheave and cable assembly for only one side of the tailboard is described herein.

Referring particularly to Figs. 1 and 2, the sheave and cable assembly of the tailboard elevating mechanism, at the left side of the vehicle, comprises a cable 83, the forward end of which is arranged to coact with the hydraulic assembly 82 to be actuated thereby in the same manner as cable 53 is actuated by the hydraulic cylinder assembly of the load unit shifting mechanism.

The cable 83 extends rearwardly to and partially around sheave 84 which is suitably mounted upon the chassis 15 as by a bracket 85 and bolts or screws 86, 87, thence upwardly to and around sheave 88, mounted upon a short shaft 89 which is carried in the upper end of stanchion 29, thence the cable 83 extends downwardly to and is fixed to the upper end of upright sliding column 28.

The operation of the mechanism

The operation of the mechanism comprising the invention may best be understood from Figs. 6–10, inclusive. In a first of various labor saving uses of the invention, particularly illustrated by Figs. 6 and 7, a load unit which may be the first desired to be placed into an empty vehicle, may be placed upon the tailboard 25 in any suitable manner as by hand or by use of a conventional lift truck, at a time when the tailboard is either lowered substantially to a floor or sidewalk level or to the level of a loading platform.

The said load unit when assembled may comprise a pallet 35, and stacked material A on said pallet generally indicated in the drawings as a stack of carton-packed material, preferably arranged within vertical planes coinciding with the four sides of the pallet 35. The load unit, when disposed exteriorly of the vehicle, preferably is carried upon a suitable skid 90 held against forward or rearward movement on the tailboard by any suitable means as for example by tapered pins 91 which may be placed in suitable holes in the tailboard, located forwardly and rearwardly of the skid 90. The pins 91, preferably, do not extend high enough to interfere with horizontal shifting of the load unit as hereinafter described.

Figure 6:
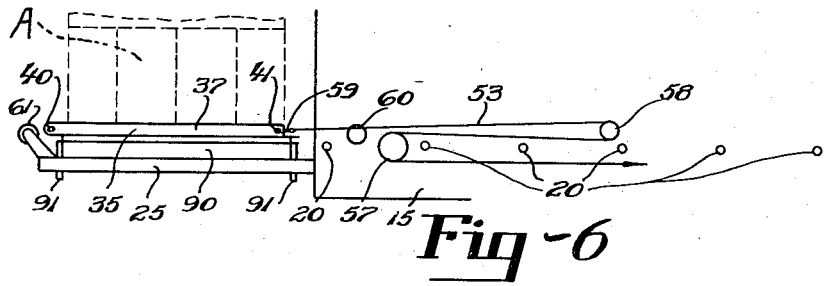
Fig. 6 is a diagram of certain parts of the load unit shifting mechanism prepared, as in Fig. 1, for pulling a unit of material into or onto the trailer.

In order to shift the load unit into the vehicle, the tailboard 25, by suitable operation of its related hydraulic cylinder assembly, is brought to the height thereof, relatively to the chassis, indicated in Fig. 6 wherein the pallet 35 is preferably at least slightly above the level of the rearmost roller 20. Then the operator, after assuring that the cables 53 are arranged upon their related sheaves in the manner shown in Fig. 6, engages the hooks 59 of said cables in the holes 41 in the forward ends of the flanges 37 of the pallet.

Figure 7:
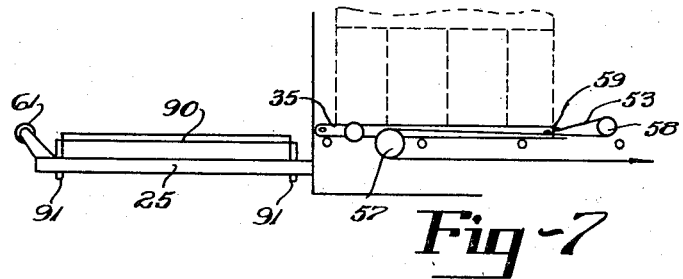
Fig. 7 is a diagram somewhat similar to Fig. 6 but showing the relation of the parts of the shifting mechanism after the unit of material has been pulled into or onto the trailer.

The cables 53 are then pulled, in the direction indicated by the arrow thereon, by suitable operation of the related hydraulic assembly, causing the load unit to be slid forwardly to the position thereof shown in Fig. 7, the skid 90 being held upon the tailboard by the pins 91. The operator, from the exterior of the vehicle, may then unhook the cables 53 from the pallet 35, after which the load unit, may easily be pushed manually over the rollers 20, to the front end of the vehicle where it may be held against undesired shifting longitudinally of the vehicle in any suitable manner, as for example by tapered pins 92 which, as shown in Fig. 3, may be inserted in the recesses 42 of the pallet 35 and into suitably positioned holes in the stringer 69 and the longitudinal plate 19.

A next and enough other units to fill the vehicle may, if desired, be moved into the vehicle in the manner just described. In that event protruding rear ends of the flanges 37 of one pallet would align with the flanges of the next rearward pallet and nest within the cut-back portion of the flange of the latter pallet and the pins 92 would be accommodated by the recesses 42 and 43 of adjacent pallets. Ordinarily the interior of the vehicle is of a length to accurately receive a suitable number of pallets with loads thereon. In loading a vehicle, it may be advantageous to interpose suitable dunnaging material, as for example, a removable lattice-like separator 93 between load units in the vehicle as shown in Fig. 8. The tailboard 25, of course, may be pivoted upwardly to a closed position, to fully enclose the load, in a well understood manner.

Another labor saving use of the invention may be derived in unloading a vehicle in a manner best understood from Figs. 8, 9, and 10. Let it be assumed that the vehicle to be unloaded was fully loaded in the manner hereinbefore described. The operator, after pivoting the tailboard from its closed position to its open horizontal position, places a skid 90 upon the tailboard, inserts pins 91 to prevent shifting of the skid, and raises or lowers tailboard 25 by suitable operation of the hydraulic assembly 82, to bring the upper surface of the skid 90 to a somewhat lower level than the top of the rearmost roller 20. The operator then disposes the cables 53 upon the various sheaves in the manner shown in Fig. 8, engaging the hooks 59 of said cables in the holes 40 in the rearward ends of the flanges 37 of the pallet 35 of the rearmost load unit in the vehicle, access to the cables for this purpose being gained by merely opening the covers or doors 70, 72.

The pins 92 at the rear of the rearmost load unit are then removed and the cables 53 are then pulled in the direction indicated by the arrow thereon, by suitable operation of their related hydraulic assembly, causing load unit to be partly rolled and partly slid from within the vehicle to its position upon the skid 90 indicated in Fig. 9. At this stage in operation, if desired, the cable 53 may be unhooked from the load unit and the tailboard lowered or raised substantially to floor level or to the level of any other receiving platform or supporting surface. The unit may then be removed from the tailboard and the goods removed from the pallet 35 by hand or by other suitable means. According to this disposition however it would ordinarily be necessary to break up the stack of material to enable the truck operator to retrieve the pallet which may be needed for further handling of loads in the continued operation of the vehicle, and therefore the present invention includes means for removing the pallet from beneath the stack of material while, nevertheless, leaving the latter intact.

In order to remove the pallet 35 from beneath the stack of material which it supports, the operator, upon getting the load unit onto the skid 90 as shown in Fig. 9, changes the cable 53 from the disposition shown in the latter figure, to that shown in Fig. 10, then inserts a rather long crossbar 94 in a position between the lowermost packages of the stacked unit of material and the rear of the vehicle body, more particularly the stanchions 29 thereof. The said crossbar of course, should be long enough to extend sufficiently to overlap both said stanchions. The pallet 35 may then be easily removed by pulling the cables 53 in the direction indicated by the arrow thereon by suitable operation of its related hydraulic assembly. This causes the pallet 35 to be pulled forcibly out of its relation to the load unit, the skid 90 being held firmly by the foremost pins 91 and the stacked material being held firmly by the crossbar 94. After the pallet 35 has been removed from the load unit the tailboard may be lowered or raised as required, and the stacked material, on the skid, may be removed from the tailboard in any suitable manner. Other load units in the vehicle may easily be rolled manually to positions adjacent the doorway and then be removed from the vehicle in the manner just described.

In the present description and in the accompanying claims, the load unit, in any of the several slightly different horizontal positions shown in Figs. 6–10, is considered as being in substantial registry with the load supporting surface or the rearmost roller 20 of the vehicle.

Conclusion

It should be apparent, from the foregoing, that the present invention is directed to certain principles which lend themselves to substantial labor savings in the handling of material, particularly in loading and unloading vehicles; also in permitting very efficient handling of units of material which are referred to herein as "load units."

The present disclosure has been confined to one of many ways in which the invention may be advantageously practiced, and the details of some features such as the hydraulic pumping and control systems, and refinements such as means for taking up slack in cables, and other features any of which may be supplied or varied in ways well within the scope of ordinary mechanical skill, have been omitted herefrom to avoid submerging the broad inventive concept in mere details and variations.

Although only a single embodiment of the invention has been described and illustrated herein, it should be obvious that the invention may be practiced in various other embodiments within the scope of the invention as defined in the following claims.

What I claim is:

1. Load handling means comprising a vehicle having load-supporting means, plural separately movable floor sections each adapted, in transit, to carry a separate load thereon and to rest upon said load-supporting means; an adjustable cable and sheave assembly carried by the vehicle and adapted, in one adjustment, to be connected to a floor section and to move the latter horizontally with its load, upon and from the said load-supporting means, onto a platform at the exterior of the vehicle; and abutment means coacting with the vehicle and with a load on the platform for holding the load against material horizontal movement; the said cable and sheave assembly being adapted, in another adjustment, to be connected to a floor section under a load so held upon the platform, and to withdraw said floor section from beneath its load while the latter continues to be supported upon the platform.

2. Load handling means comprising a vehicle having a series of substantially flat, separately movable load-carrying elements arranged in line, a loading and unloading way at one end of said series, and means for supporting said elements, and loads thereon, substantially in abutting relationship, in transit; means coacting with the vehicle and with the said elements, successively, for moving the latter, with their loads thereon, horizontally upon and from said supporting means, through said way, onto a load receiving surface at the exterior of the vehicle, and for withdrawing said elements from beneath their respective loads while the weight of the load continues to be supported by said receiving surface; and means coacting with a load, so supported, and a portion of the vehicle, for holding the load against material horizontal movement during withdrawal of the related load-carrying element.

3. A vehicle comprising an elongate body; load-supporting means; plural, substantially flat, separately movable load-carrying elements, adapted to be supported upon the said load-supporting means, in abutting relationship, in series, longitudinally of the body; a loading passage at one end of the body; an adjustable device, carried by the vehicle, for successively moving said elements horizontally through said passage; the said device, in one adjustment, being adapted for connection to a load-carrying element and to move the element from its position upon the said load-supporting means, without materially elevating it from the latter, thence through said loading passage and onto a load receiving surface disposed at the exterior of the vehicle at substantially the same level as the said load-supporting means; and means for holding a load against material horizontal movement while supported upon said load receiving surface; the said device, in another adjustment, being adapted, when connected to a load carrying element resting upon said receiving surface, to withdraw the said element from beneath the load thereon while the load is so held against horizontal movement and remains supported upon said receiving surface.

4. Load handling means comprising a vehicle having load-supporting means, and plural separately movable floor sections each adapted, in transit, to carry a separate load thereon and to rest upon said load-supporting means; adjustable means carried by the vehicle for separately moving said floor sections and adapted, in one adjustment, to be connected to a floor section and to move the latter horizontally with a load thereon, from the said load-supporting means onto a platform at the exterior of the vehicle; and means for holding a load against material horizontal movement while supported upon such a platform; the said means for moving said floor sections, in another adjustment, being adapted, when connected to a floor section resting upon such a platform, to withdraw the said floor section from beneath a load thereon while the load is so held against horizontal movement and remains supported upon said platform.

GEORGE H. PRIDE.

REFERENCES CITED

The following references are of record in the file of this patent:

UNITED STATES PATENTS

| Number | Name | Date |
| --- | --- | --- |
| 910,626 | Wortman | Jan. 26, 1909 |
| 1,148,531 | Oldham | Aug. 3, 1915 |
| 1,304,026 | Craymer | May 20, 1919 |
| 1,391,607 | Bourgeois | Sept. 20, 1921 |
| 1,427,189 | Bourgeois | Aug. 29, 1922 |
| 1,457,947 | Stranbrough | June 5, 1923 |
| 1,611,882 | Budd | Dec. 28, 1926 |
| 1,730,480 | Shirreff | Oct. 8, 1929 |
| 1,764,780 | Cochran | June 17, 1930 |
| 1,919,608 | Troell | July 25, 1933 |
| 1,944,063 | Brauner | July 16, 1934 |
| 2,045,566 | Berg | June 30, 1936 |
| 2,088,122 | Taylor | July 27, 1937 |
| 2,146,436 | Lima | Feb. 7, 1939 |
| 2,152,086 | Powell | Mar. 28, 1939 |
| 2,178,646 | Raymond et al. | Nov. 7, 1939 |